June 27, 1967  A. LINDBERG ET AL  3,327,408
DEMONSTRATION DEVICE CONSTRUCTED IN THE MANNER
OF AN OPTICAL BENCH
Filed June 8, 1964
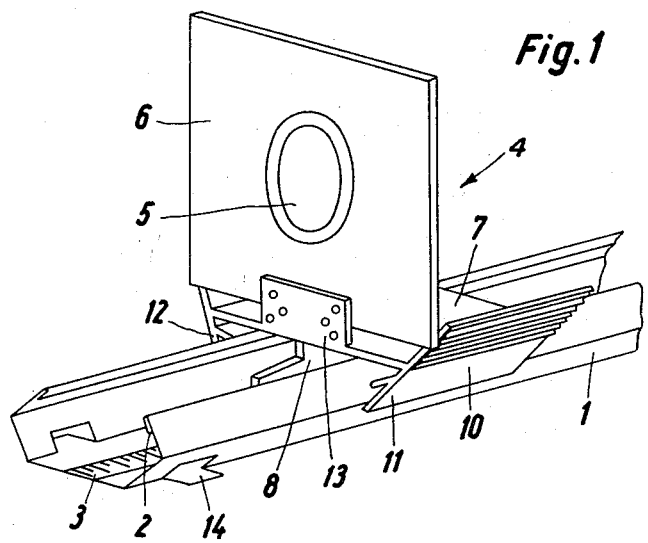
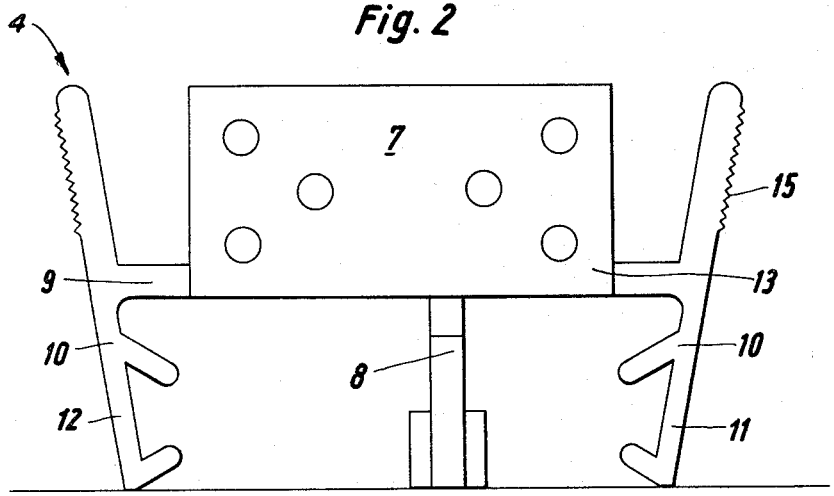
Inventors:
Albert Lindberg
Klaus Verfuss
By: Spencer & Kaye
ATTORNEYS United States Patent Office 3,327,408
Patented June 27, 1967

3,327,408
DEMONSTRATION DEVICE CONSTRUCTED IN THE MANNER OF AN OPTICAL BENCH
Albert Lindberg, Cologne-Marienburg, and Klaus Verfuss, Leverkusen, Germany, assignors, by mesne assignments, to Leybold Holding A.G., Zug, Switzerland
Filed June 8, 1964, Ser. No. 373,379
Claims priority, application Germany, June 7, 1963, L 45,053
15 Claims. (Cl. 35—19)

The present invention relates to a demonstration device constructed in the manner of an optical bench, so that it is especially useful for demonstrating both optical and mechanical experiments.

Embodiments of optical benches are known in which individual optical attachment elements, such as lens carriers, ground-glass plates, light sources, and the like can be moved relative to each other on massive, ground profile bars. However, such devices are very expensive, due to the high degree of accuracy required in the manufacture of the profile bars, and because of the attachment elements which are fitted to the profile bars. Moreover, the known devices are usable only for limited kind of experiments, such as optical experiments.

It is therefore an object of the present invention to provide a demonstration device constructed in the form of an optical bench, which makes it possible to carry out optical experiments with the requisite accuracy and which can also be employed for various experiments in mechanics. The latter may be, for example, inclined plane experiments in which a mass is rolled or slid down the bottom surface of the profile rod and characteristics of its motion measured. The optical bench of the instant invention has a guide rail in the form of a profile rod. The cross section of the profile rod is in the form of a double trapezoid open on one side. In a preferred embodiment, the cross section is symmetrical. A suitable material for the open profile rod is rolled steel sheet. Furthermore, it is advantageous to reinforce the edges of the profile bar at the open side by folding them over. In this way, a demonstration device in the form of an optical bench may be constructed wherein the costs of the guide rail and attachment elements are relatively minor, yet in which there is sufficient rigidity in the arrangement of the optical attachment elements relative to one another to perform accurate experiments.

Additional objects and advantages of the present invention will become apparent upon consideration of the following description when taken in conjunction with the accompanying drawings in which:

FIGURE 1 is a perspective view of a demonstration device constructed in accordance with the invention.

FIGURE 2 is a front view of a guide piece which may form a part of the apparatus of the invention.

In a preferred embodiment, a scale division is provided on the bottom of the profile bar, from which the position of the individual attachment elements may be read. Similar scale divisions can be arranged at one, or both sides of the outer surfaces of the profile bar. These scale divisions may be made by direct inscription on the bottom of the profile bar, or in the form of inlaid strips.

The invention also includes a guide section, made of resilient material (preferably plastic). This guide section may be placed upon the profile rod as a mount for the lenses or other optical elements to be used in a demonstration. It may include a flat carrier plate for mounting the optical elements. A further advantage may be achieved by providing a support lug on the guide section which contracts the bottom of the profile bar. The support lug may be suitably fashioned as an indicating element, so that it is possible to read off the position of the attachment element on the scale divisions provided on the bottom of the profile bar. In order to be able to move the individual attachment elements close to one another, the support lug may be attached to the guide section so that it projects at a point spaced from the axis of symmetry of the profile rod. In this way, when the guide sections are moved together, the support lugs slide by one another. If the guide sections are made identical, one of the guide sections may be used in a position rotated 180° from that of the other guide sections, to accomplish a similar result.

A particularly suitable configuration may be provided by constructing the guide section in the shape of a bracket having a center cross piece, with a jaw at either end provided with guide rails. The cross piece carries fastening elements for the sheet-like support piece, as well as the support lug. When the guide section is mounted on the profile bar, the guide rails contact the two outermost edges of the profile bar, formed by the bent sides thereof. By this means a secure support is afforded; since the spacing between the jaws is made slightly less in width than that between the edges, so that the jaws firmly grip the edges. In order to facilitate handling of the guide section, the jaws thereof may be provided with grooved or scored gripping surfaces. It is also advantageous under certain circumstances to make the lower ends of the two jaws of the guide piece lie in the same plane as the lower edge of the support lug. This improves the stability of the device when it is sitting on a table, for instance, and especially when the attachment elements are positioned outboard of the profile rod.

When the demonstration device is used as an inclined plane for demonstrating experiments in mechanics, the profile bar interior acts as a guide for the spherical or other objects used in such experiments, for example for the demonstration of motion phenomena.

With specific reference to the drawings, in FIGURE 1, a profile bar 1 is shown, the profile of which is a symmetrical double trapezoid with one of the lateral surfaces open. In order to provide increased structural rigidity, the profile edge 2 have been reinforced at the upper (profile) side by folding. A scale division 3 can be seen on the bottom of the profile rod 1, and may take the form of an inlaid strip, or may be engraved directly upon the bottom, or may be provided in any other suitable manner. An attachment element 4, which is shown as a lens carrier holding an optical lens 5, includes a carrier plate 6 and a guide member or section 7, to which it is attached. Guide section 7 may be constructed of a single piece of plastic. The plate 6 may be attached to guide member 7 by means of rivets. The guide section 7 is provided with a support lug 8 which permits reading the position of the attachment element 4 from the scale division 3 positioned beneath the lug. The lug may ride upon the bottom surface of the profile rod and/or the surface of scale division 3.

The configuration of the guide section 7 may be seen in FIGURE 2. Clamping jaws 10, provided with guide rails 11 and 12, are positioned on either side of a center cross piece 9 so that the guide rails may contact the outermost edges of the profile bar. The spacing of the jaws is such that they must be spread to fit over the edges, producing a state of tension, so that a firm and stable arrangement results. A mount 13 is provided on the cross piece 9, to which the carrier plate 6 may be connected by means of rivets. The cross piece 9 also carries support lug 8, described in detail above. The angle of inclination of the clamping jaws 10 is chosen such that, taking into account the resiliency of the plastic, the guide section 7 may be attached to the profile rod 1 by spreading the jaws apart and placing them over the outer edges of the profile rod, as shown in FIGURE 1. Vertical orientation of the attachment element 4 is assured due to the spring force exerted inwardly by the jaws 10 upon the outer edges of the profile rod.

The stability of the apparatus may be increased by bending portions of the profile rod side wall into the plane of the bottom of the profile rod to form support flaps 14, in the end regions of the profile rod 1. The clamping jaws 10 are provided with scored gripping surfaces 15.

It will be understood that the above description of the present invention is susceptible to various modifications, changes and adaptations, and the same are intended to be comprehended within the meaning and range of equivalents of the appended claims.

What is claimed is:

1. In a device for use in demonstrating optical and mechanical experiments and including an optical bench having a guide rail, the improvement wherein said guide rail is in the form of a profile rod the cross section of which is a double trapezoid open on one side, said double trapezoid being symmetrical and the edges thereof bordering on said open side being folded back for reinforcement, the sides of said profile rod including two parallel exterior edges, and further including a resilient guide section mounted for movement along said edges, and means for mounting an optical element on said guide section in a plane perpendicular to the axis of the profile rod.

2. A demonstration device as defined in claim 1, further including a support lug attached to said guide section and extending toward the bottom of the profile rod.

3. A demonstration device as defined in claim 2, wherein scale divisions are provided on the profile rod bottom and the support lug rides along the scale divisions for indicating the position of the optical element with respect to the profile rod.

4. A demonstration device as defined in claim 3, wherein said support lug is laterally displaced from the center axis of the profile rod.

5. A device as defined in claim 1, wherein said guide section includes a cross piece and a pair of jaws, one on each side of said cross piece, each jaw being provided with guide rails, so that when said jaws are urged apart and placed over the edges of the profile rod, the rails provide a clamping connection with said edges.

6. A device as defined in claim 5, further including a support lug attached to said cross piece and extending toward the bottom of the profile rod.

7. A demonstration device as defined in claim 5, wherein said jaws are provided with scored gripping surfaces.

8. A demonstration device as defined in claim 5, further including a carrier piece in the form of a sheet; means attached to said cross piece for mounting the carrier piece thereon; and means in said carrier piece for attaching an optical element thereto.

9. A demonstration device as defined in claim 2, wherein the support lug lies in a plane defined by the lower edges of the guide section jaws.

10. In a device for use in demonstrating optical and mechanical experiments and including an optical bench having a guide rail, the improvement wherein said guide rail is in the form of a profile rod the cross section of which is a double trapezoid open on one side, said double trapezoid being symmetrical, said profile rod being provided with support flaps in the end regions of the profile rod, the flaps being formed of sections of the sides of the profile rod bent into the plane of the bottom portion thereof.

11. A device for demonstrating optical and mechanical experiments, said device comprising, in combination:
    first means in the form of a longitudinally extended sheet for supporting optical elements, said sheet having a cross section in the form of a symmetrical double trapezoid open on one side; and
    second means slidably attached to the first means for holding an optical element in a plane perpendicular to the longitudinal direction of said means.

12. A device as defined in claim 11, wherein the two outer edges of the cross section of said first means are apices; said second means including a resilient cross piece having a jaw on each end for gripping said edges.

13. A device as defined in claim 12, wherein the second means includes a flat plate fastened to said cross piece and in a plane perpendicular to said longitudinal direction.

14. A device as defined in claim 13, wherein the first means has a scale extending in the longitudinal direction, and further including support lug means fastened to the cross piece and extending to the bottom surface of said first means.

15. A device for demonstrating optical and mechanical experiments, said device comprising, in combination:
    first means in the form of a longitudinally extended sheet for supporting optical elements, said sheet having a profiled cross section in the form of two spaced and oppositely directed horizontally disposed V-shaped portions joined along their respective bottom edges; and
    second means slidably attached to the first means for holding an optical element in a plane perpendicular to said longitudinal direction.

References Cited

UNITED STATES PATENTS

| 2,348,858 | 5/1944 | Sheehy | 88—56 |
| 2,675,277 | 4/1954 | McClellan | 308—3.8 |
| 2,803,986 | 8/1957 | Choiniere | 88—1 |

FOREIGN PATENTS 614,637  12/1948  Great Britain.

EUGENE R. CAPOZIO, *Primary Examiner.*

H. S. SKOGQUIST, *Assistant Examiner.*